(12) United States Patent
Moeckly et al.

(10) Patent No.: US 9,376,983 B2
(45) Date of Patent: Jun. 28, 2016

(54) OPERATIONS SUPPORT SYSTEMS AND METHODS WITH ACOUSTICS EVALUATION AND CONTROL

(71) Applicant: HONEYWELL INTERNATIONAL INC., Morristown, NJ (US)

(72) Inventors: Kevin Moeckly, Chandler, AZ (US); Richard Ling, Scottsdale, AZ (US); Chuck Royalty, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 750 days.

(21) Appl. No.: 13/690,765

(22) Filed: Nov. 30, 2012

(65) Prior Publication Data
US 2014/0156166 A1    Jun. 5, 2014

(51) Int. Cl.
| | |
|---|---|
| F02D 45/00 | (2006.01) |
| G06F 19/00 | (2011.01) |
| G01M 15/12 | (2006.01) |
| G06F 19/10 | (2011.01) |
| G05B 23/02 | (2006.01) |

(52) U.S. Cl.
CPC .............. *F02D 45/00* (2013.01); *G01M 15/12* (2013.01); *G06F 19/00* (2013.01); *G05B 23/0221* (2013.01)

(58) Field of Classification Search
CPC ................ G01R 31/1209; G06F 3/043; B60R 2021/01184; B60R 21/0173
USPC ........ 701/102, 32.3, 32.4, 34.4, 99, 111, 100; 340/943; 324/158; 318/490; 73/659
See application file for complete search history.

(56) References Cited

U.S. PATENT DOCUMENTS

| | | | |
|---|---|---|---|
| 4,215,412 A | 7/1980 | Bernier et al. | |
| 4,965,513 A * | 10/1990 | Haynes | ............... F16K 37/0083 318/490 |
| 5,018,069 A | 5/1991 | Pettigrew | |
| 5,908,176 A | 6/1999 | Gilyard | |
| 6,267,100 B1 | 7/2001 | Torno et al. | |

(Continued)

FOREIGN PATENT DOCUMENTS

| | | |
|---|---|---|
| CA | 2604118 C | 6/2010 |
| DE | 102009027413 A1 | 1/2011 |

(Continued)

OTHER PUBLICATIONS

USPTO Final Office Action, Notification Date Jul. 27, 2015; U.S. Appl. No. 13/707,174.

(Continued)

*Primary Examiner* — Stephen K Cronin
*Assistant Examiner* — Joshua A Campbell
(74) *Attorney, Agent, or Firm* — Ingrassia Fisher & Lorenz, P.C.

(57) ABSTRACT

An operations support system is provided for an engine. The system includes a diagnostics module configured to receive engine data from the engine and to generate diagnostics data based on the engine data using a thermodynamic model, the thermodynamic model being based on component maps associated with the engine; an acoustics module coupled to the diagnostics module and comprising an acoustics calculation unit, the acoustics calculation unit configured to receive the diagnostics data and to determine an acoustics level for the engine based on the diagnostics data; and a graphical user interface coupled to the acoustics module and configured to display the acoustics level.

20 Claims, 4 Drawing Sheets

(56) References Cited

U.S. PATENT DOCUMENTS

| | | | |
|---|---|---|---|
| 6,532,412 B2 | 3/2003 | Adibhatla et al. | |
| 6,905,091 B2 | 6/2005 | Berson et al. | |
| 7,058,556 B2 | 6/2006 | Desai et al. | |
| 7,071,841 B2* | 7/2006 | Haynes | G01S 11/14 340/943 |
| 7,383,104 B2 | 6/2008 | Ishii et al. | |
| 7,725,199 B2 | 5/2010 | Brackney | |
| 7,742,904 B2 | 6/2010 | Healy et al. | |
| 7,822,512 B2 | 10/2010 | Thatcher et al. | |
| 7,904,282 B2 | 3/2011 | Goebel et al. | |
| 7,979,147 B1* | 7/2011 | Dunn | G10K 15/02 181/192 |
| 8,050,843 B2 | 11/2011 | von Hoff et al. | |
| 2002/0193933 A1 | 12/2002 | Adibhatla et al. | |
| 2003/0074171 A1 | 4/2003 | Desai et al. | |
| 2004/0249520 A1 | 12/2004 | Maine | |
| 2004/0260454 A1* | 12/2004 | Basir | G01M 15/05 701/111 |
| 2005/0096873 A1 | 5/2005 | Klein | |
| 2006/0047403 A1 | 3/2006 | Volponi et al. | |
| 2006/0048800 A1* | 3/2006 | Rast | A47L 1/02 134/56 R |
| 2007/0118271 A1 | 5/2007 | Wiseman et al. | |
| 2008/0141072 A1 | 6/2008 | Kalgren et al. | |
| 2008/0228338 A1 | 9/2008 | Howard et al. | |
| 2008/0235172 A1 | 9/2008 | Rosenstein et al. | |
| 2008/0243352 A1 | 10/2008 | Healy | |
| 2009/0173078 A1 | 7/2009 | Thatcher et al. | |
| 2009/0306839 A1 | 12/2009 | Youngquist et al. | |
| 2010/0076672 A1 | 3/2010 | Cremers | |
| 2010/0145569 A1* | 6/2010 | Bourque | G06Q 10/047 701/31.4 |
| 2010/0161154 A1 | 6/2010 | Moeckly et al. | |
| 2010/0161196 A1* | 6/2010 | Goericke | G05B 23/0283 701/99 |
| 2010/0228495 A1* | 9/2010 | Leuthardt | A61B 5/0002 702/19 |
| 2010/0280731 A1 | 11/2010 | Snider | |
| 2011/0077783 A1 | 3/2011 | Karpman et al. | |
| 2011/0202251 A1 | 8/2011 | Luppold | |
| 2013/0158832 A1* | 6/2013 | Moeckly | F02C 9/00 701/101 |
| 2014/0156166 A1* | 6/2014 | Moeckly | F02D 45/00 701/102 |
| 2014/0163838 A1 | 6/2014 | Moeckly et al. | |

FOREIGN PATENT DOCUMENTS

| | | |
|---|---|---|
| EP | 0050610 B1 | 5/1982 |
| EP | 1103926 A2 | 5/2001 |
| EP | 1298512 A2 | 4/2003 |
| EP | 1420153 A2 | 5/2004 |
| EP | 1630633 A2 | 3/2006 |
| EP | 1970786 A2 | 9/2008 |
| EP | 2434127 A2 | 3/2012 |
| WO | 8103079 | 10/1981 |

OTHER PUBLICATIONS

USPTO Office Action U.S. Appl. No. 13/707,174; Notification date May 22, 2014.

EP Search Report for Application No. 13190385.5, dated Feb. 17, 2014.

EP Examination Report for Application No. 13190385.5, dated Jul. 21, 2014.

USPTO Office Action, Notification Date Nov. 4, 2014; U.S. Appl. No. 13/911,779.

FUELFLOW_WF_Ibm_per_sec.pdf (Ken Gould, Phil Weed, The Aircraft Engine Design Project Fundamentals of Engine Cycles, Spring 2009, GE Aviation, pp. 1-18).

EP Extended Search Report for Application No. EP 14168886.1 dated Jan. 26, 2015.

USPTO Final Office Action, Notification Date Jan. 27, 2015; U.S. Appl. No. 13/707,174.

Kazin, S. B. et al: "Core Engine Noise Control Program" vol. III, Prediction Methods, Report date: Aug. 1974; Source: http://www.dtic.mil/dtic/tr/fulltext/u2/a013131.pdf.

Raney, J. P.: "Research Needs in Aircraft Noise Prediction" Prepared by NASA Langley Research Center for the National Aeronautics and Space Administration, Report No. TM X-72787, Report Date: Nov. 1975; Source: http://ntrs.nasa.gov/archive/nasa/casi.ntrs.nasa.gov/19760006011_1976006011.pdf.

Brotherton, T. et al. "eSTORM: Enhanced Self Tuning On-board Real-time Engine Model," Proceedings of the 2003 IEEE Aerospace Conference, Big Sky MT, Mar. 2003, pp. 1-12.

Volponi, A., et al. "Engine Health Management for Aircraft Propulsion Systems." Retrieved on Sep. 5, 2012. Retrieved from Internet: <URL: http://www.tzhealth.com/medical-devices/Flow%20Injection%20Analysis%20Systems/rotation%20position%20fuel%20flow%20fuel%20system%20pressures%20temperatures%20Urban.htm>.

Bazazzadeh, M. et al. "Improved Turbine Engine Hierarchical Modeling and Simulation Based on Engine Fuel Control System," Iranian Aerospace Society, Winter 2009, pp. 45-53, vol. 6, No. 1.

Li, Y.G. "Performance Analysis Based Gas Turbine Diagnostics: A Review," Proceedings of the Institution of Mechanical Engineers, Part A: Journal of Power and Energy, Sep. 1, 2002, pp. 363-377, vol. 216, No. 5.

Borguet, S.J. "Variations on the Kalman filter for enhanced performance monitoring of gas turbine engines." Retrieved on Sep. 6, 2012. Retrieved from Internet: <URL: http://orbi.ulg.ac.be/handle/2268/120067>.

Volponi, A.J. et al. "Development of an Information Fusion System for Engine Diagnostics and Health Management," The NASA STI Program Office, Feb. 2004, pp. 1-17.

Goericke, J. et al.: Operations Support Systems and Methods with Engine Diagnostics, filed with the USPTO on Dec. 23, 2008 and assigned U.S. Appl. No. 12/342,562.

Moeckly, K. et al. Operations Support Systems and Methods with Power Assurance, filed with the USPTO on Dec. 23, 2008 and assigned U.S. Appl. No. 12/342,633.

Moeckly, K. et al. Operations Support Systems and Methods with Power Management, filed with the USPTO on Dec. 23, 2008 and assigned U.S. Appl. No. 12/342,581.

Moeckly, K. et al. Operations Support Systems and Methods for Calculating and Evaluating Engine Emissions, filed with the USPTO on Dec. 19, 2011 and assigned U.S. Appl. No. 13/330,326.

Moeckly, K. et al. Operations Support Systems and Methods for Calculating and Evaluating Turbine Temperatures and Health, filed with the USPTO on Dec. 6, 2012 and assigned U.S. Appl. No. 13/707,174.

USPTO Notice of Allowance, Notification Date Dec. 16, 2015, U.S. Appl. No. 13/707,174.

\* cited by examiner

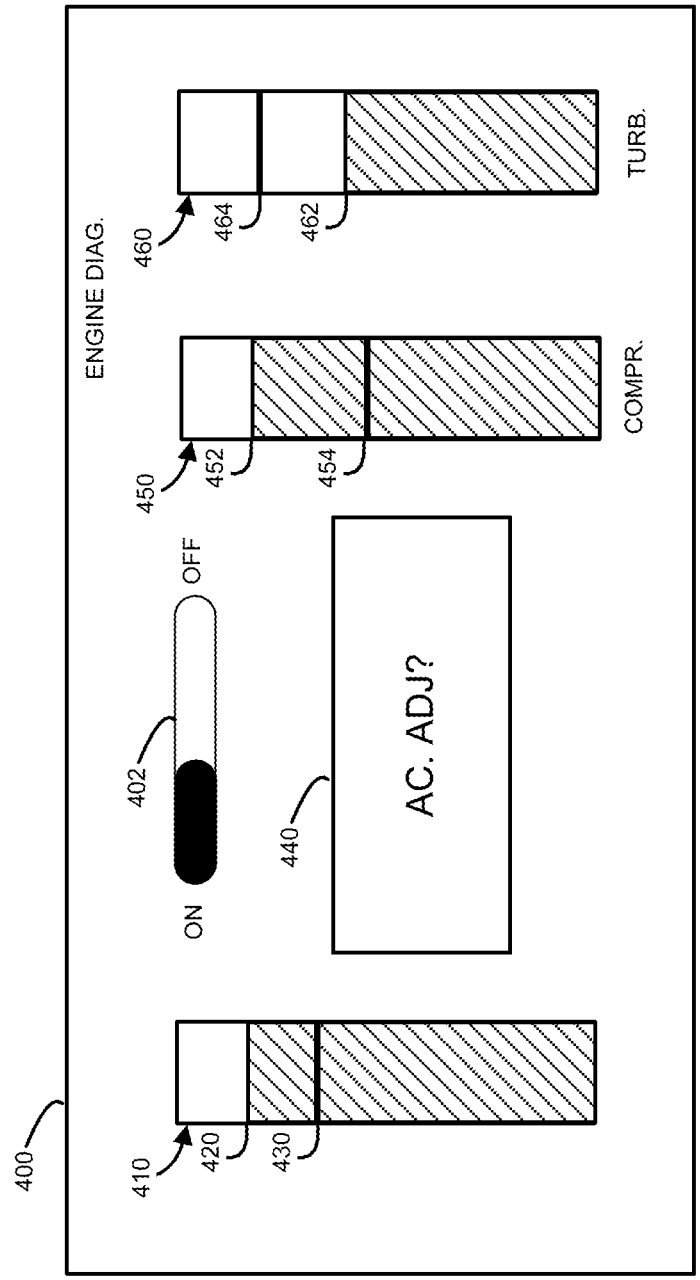

OPERATIONS SUPPORT SYSTEMS AND METHODS WITH ACOUSTICS EVALUATION AND CONTROL

TECHNICAL FIELD

The subject invention relates to operations support of gas turbine engines, and more particularly, to operations support systems and methods with acoustics evaluation and control.

BACKGROUND

Aircraft and other vehicles generate noise during operation. Noise may be generated by various types of aircraft sources, including the propellers, the landing gear, and in particular, the engine. At times, noise that exceeds a certain level may be problematic. As examples, noise particularly may be an issue when the aircraft is on the ground or near a populated area. As a result, some government and industry regulations may attempt to place limits and restrictions on the level of noise generated by aircraft.

Typically, aircraft designers attempt to limit noise with structural modifications to the engine, such as additional sound insulation. However, these modifications may add weight, complexity, and cost, and may adversely impact performance and efficiency. Additionally, these modifications attempt to address an issue that is only a problem during certain flight conditions.

Accordingly, it is desirable to provide improved engine support systems and methods that enhance engine operation, particularly with respect to acoustic characteristics. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an operations support system is provided for an engine. The system includes a diagnostics module configured to receive engine data from the engine and to generate diagnostics data based on the engine data using a thermodynamic model, the thermodynamic model being based on component maps associated with the engine; an acoustics module coupled to the diagnostics module and comprising an acoustics calculation unit, the acoustics calculation unit configured to receive the diagnostics data and to determine an acoustics level for the engine based on the diagnostics data; and a graphical user interface coupled to the acoustics module and configured to display the acoustics level.

In accordance with an exemplary embodiment, a method is provided for supporting operations of an engine. The method includes the steps of collecting engine data; generating diagnostics data from the engine data using a thermodynamic model based on component maps associated with the engine; calculating acoustics level from the diagnostics data; and displaying the acoustics level on a graphical user display.

BRIEF DESCRIPTION OF THE DRAWINGS

The present invention will hereinafter be described in conjunction with the following drawing figures, wherein like numerals denote like elements, and wherein:

FIG. 4 is a component health visual display rendered by the acoustics module of FIG. 3 in accordance with an exemplary embodiment.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to operations support systems and methods. More specifically, exemplary embodiments include an engine diagnostics module that receives engine data from an aircraft engine and generates diagnostics data, such as condition indicators, health indicators, and scalars based on the engine data using a thermodynamic model. The systems and methods further include an acoustics module that determines the acoustic characteristics based on the diagnostics data and, if desired, adjusts operation of the engine to achieve an acoustics result.

As used herein, the terms "acoustics" and "acoustic characteristics" refer to the sound or noise emanating from the engine. Such characteristics may include the level or intensity of the radiated noise (e.g., in decibels), frequency, and pressure levels. Unless otherwise noted, the terms, acoustics, acoustic characteristics, radiated noise, noise, and sound are used interchangeably below.

Figure 1:
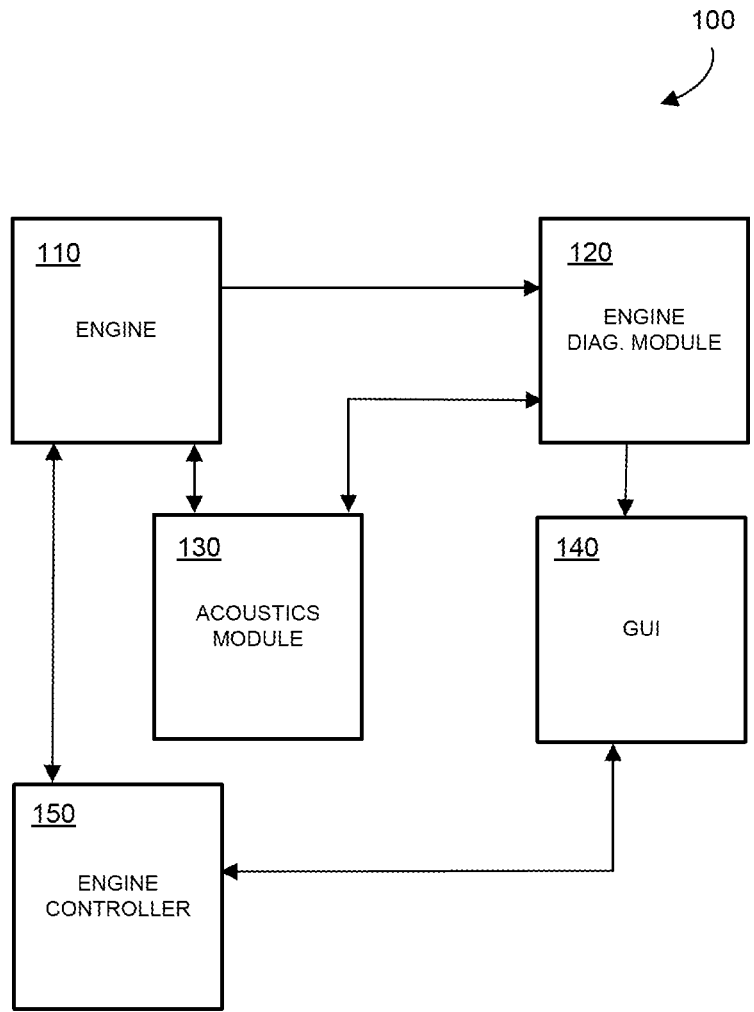
FIG. 1 is a block diagram of an operations support system for supporting and sustaining operation of an engine in accordance with an exemplary embodiment.

FIG. 1 is a block diagram of an operations support system 100 for supporting and sustaining operation of an engine 110. The system 100 processes engine data from the engine 110. The engine 110 can be a gas turbine engine, such as an engine for an aircraft. In one embodiment, the engine 110 can include compressors that supply compressed air to a combustor. The compressed air can be mixed with fuel and ignited in the combustor to produce combustion gases. The combustion gases are directed to high pressure and low pressure turbines that extract energy, for example, to provide horsepower. In general, the system 100 disclosed herein may be employed in conjunction with any gas turbine engine configuration. In one exemplary embodiment, the engine 110 is a gas turbine engine for an aircraft, such as a helicopter, although other applications are also possible. As discussed in greater detail below, the operations support system 100 may be used to support a single engine 110 or a number of engines, such as for a fleet of aircraft. The engine 100 may be controlled based on an engine controller 150, which may include any necessary or desired processing and storage components (e.g., ECU components) to control operation of the engine 100. For example, the pilot may provide commands indicated intended aircraft actions, and the engine controller 150 may generate the engine commands necessary to effectuate those actions.

As shown in FIG. 1, the system 100 includes an engine diagnostics module 120 and an acoustics module 130 to support and sustain engine operation. The engine diagnostics module 120 and acoustics module 130 provide outputs to a graphical user interface 140. As will be discussed in further detail below, the engine diagnostics module 120 receives engine data and outputs diagnostic data (e.g., condition indicators, health indictors, prognostic indicators, and/or scalars) to the acoustics module 130 and the graphical user interface 140 to assist in operating and maintaining the aircraft.

As a general matter, the diagnostics data is used by the acoustics module 130 to evaluate the acoustic characteristics of the engine 110, including the radiated noise from engine operation. If necessary or desired, the acoustics module 130 may modify operation of the engine 110 to modify the acoustic characteristics, as will be discussed in greater detail below.

As also discussed below, the modules 120, 130 may use engine data, one or more thermodynamic models, configuration data, and user inputs to generate the condition indicators. In turn, these condition indicators may be used to generate health indicators. Generally, condition indicators describe aspects about a particular component or system that may be useful in making a determination about the state or health of the component or system, which may be reflected as health indicators that depends on one or more condition indicators. Moreover, the condition indicators and health indicators can be used to determine the future health of the component or system, as is reflected in a prognostic indicator. Scalars, which correspond to differences between expected values and measured values, may be used to modify the models, as also discussed below.

In general, the engine diagnostics module 120, acoustics module 130, and graphical user interface 140 are located on-board the aircraft. However, any of the components of the system 100 may be located on-board the aircraft, off-board the aircraft, or a combination of on-board and off-board the aircraft. The system components 120, 130, 140 each contain or share the processing components necessary to accomplish the individual and collective functions discussed in greater detail below. As some examples, the processing components may include digital computers or microprocessors with suitable logic circuitry, memory, software and communication buses to store and process the models within the modules discussed below. Although not shown, one or more of the system components 120, 130, 140 may include a database (e.g., a memory device) that stores digital flight, terrain, aircraft, and/or acoustics information, which may be uploaded prior to operation or received from external sources, such as an airport transmitter, onboard sensors, or other systems (e.g., a flight management system).

Also, for example, the system 100 can be arranged as an integrated system or a subsystem of a more comprehensive aircraft system (e.g., flight management system or navigation and control system). The system 100 may be utilized in an aircraft, such as a helicopter, airplane, or unmanned vehicle. Moreover, exemplary embodiments of the system 100 may also be utilized in spacecraft, ships, submarines, and other types of vehicles, as well as industrial applications. For simplicity, embodiments are described below with reference to "aircraft." The modules 120, 130 will be described in greater detail below with reference to FIGS. 2 and 3.

The graphical user interface 140 typically includes at least a display device and a user input device. Such a display device may include any device or apparatus configured to display flight information or other data associated with operation of the aircraft, including the acoustics information discussed below. Any suitable type of display medium capable of visually presenting multi-colored or monochrome flight information for a pilot or other flight crew member may be provided, such as, for example, various CRT, flat-panel, and other types of display systems (e.g., LCDs, OLED displays, plasma displays, projection displays, HDDs, HUDs, etc.). The graphical user interface 140 and/or modules 120, 130 may include a graphics display generator for generating the appropriate display commands and resulting symbology, as discussed in greater detail below. In general, the user input device allows a user (e.g., pilot, co-pilot, or crew member) to interact with the system 100 and may be realized as a keypad, touchpad, keyboard, mouse, touchscreen, joystick, microphone, interactive display widget, and/or another suitable device or mechanism adapted to receive input from a user. In this embodiment, the graphical user interface 140 is located within a cockpit of the aircraft. It should be appreciated that, in practice, the graphical user interface 140 may be located outside the aircraft (e.g., on the ground as part of an air traffic control center or another command center) and communicatively coupled to the aircraft.

Figure 2:
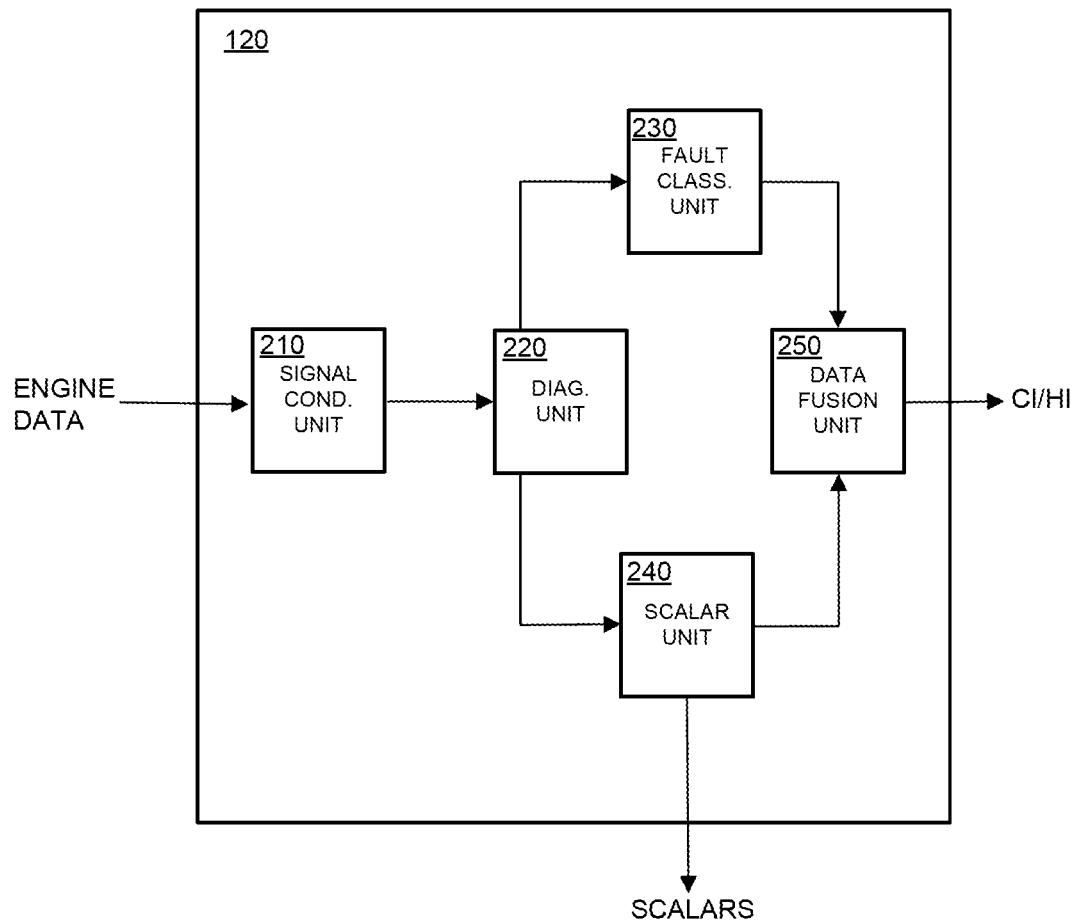
FIG. 2 is a block diagram of an engine diagnostics module of the operations support system of FIG. 1 in accordance with an exemplary embodiment.

FIG. 2 is a block diagram of the engine diagnostics module 120 in accordance with an exemplary embodiment. As noted above, engine data is received by the engine diagnostics module 120 as inputs. The engine data can include any suitable type of data related to the engine or aircraft, such as for example, one or more of the following: engine operating hours; static pressure, total pressure, and temperature at various positions within the engine 110, such as the inlet or outlet of the compressors, combustor, and turbines; gas producer speed; engine torque; engine torque sensor voltage; temperature at the oil resistance bulb; and metered fuel flow. Other engine data can include the calibrated airspeed of the aircraft, ambient temperature, and ambient total pressure. In some embodiments, the engine data may include microphone data (e.g., direct noise measurement), although in other embodiments, microphone data may be omitted to avoid environmental or non-engine noise.

The engine diagnostics module 120 includes a signal conditioning unit 210 that receives the engine data and performs in-range and signal validity checks. The signal conditioning unit 210 may further perform unit conversion and scaling on the engine data such that it is suitable for use by subsequent units. Additionally, the signal conditioning unit 210 may perform some filtering, sampling and steady state detection.

The conditioned engine data from the signal conditioning unit 210 is provided to the diagnostic unit 220. The diagnostic unit 220 processes the data through an engine diagnostic model. In general, the diagnostic unit 220 provides fully automated, steady state, on-board engine diagnostics. The model used by the diagnostic unit 220 is a mathematical representation of the engine 110 based on component maps. The diagnostic unit 220 is configured to match the model engine operating parameters to the measured engine operating parameters, and to generate condition indicators for the engine components. The engine-specific model generates engine output parameters representing the states of the actual engine in real time. This engine-specific model produces aerodynamic and thermodynamic engine parameters of the running engine. In other words, the generation of acoustics parameters, described below, is contained within the engine-specific model and makes use of aerodynamic and thermodynamic engine parameters produced by the engine-specific model to calculate acoustic information with high fidelity. In effect, the acoustic parameters are a fall-out from the acoustic "calculator" being contained within the engine-specific model. This acoustic calculator uses the engine parameters from the engine-specific model and produces acoustic numbers real-time alongside the other engine cycle information coming from the engine-specific model.

The diagnostic unit 220 additionally produces scalars based on the model. As noted above, scalars are the difference between expected engine states and the actual engine states. These differences could be a result, for example, of engineto-engine differences and/or erosion of engine components. In one example, the scalars can represent the erosion of the turbine blades. The scalars may be utilized as coefficients, biases, and adders used to adjust the thermodynamic equations of the model. As one example, the scalars scale engine component airflows and efficiencies to match the measured data. This matching process is accomplished by executing an adaptive algorithm designed to iteratively adjust or adapt the nominal engine component efficiencies using the scalars. As such, the thermodynamic engine model accurately mirrors actual engine performance over time, and the model is improved as an engine-specific model. The diagnostic unit 220 therefore accounts not only for changes in overall engine health, but also for changes in health of the components of the engine 110.

The diagnostic unit 220 provides the condition indicators and scalars to the fault classification unit 230, which includes a pattern recognition algorithm that maps the condition indicators to a library of known fault patterns. The fault classification unit 230 may then generate health indicators based on the confidence intervals that indicate, for example, the individual contributions of each engine component on overall engine performance degradation. The health indicators may also generate the confidence and severity of any detected faults as fault confidence and severity information.

The scalar unit 240 also receives the scalars data from the diagnostic unit 220 and provides binning and storing of engine diagnostic scalars, as well as statistical analysis of the binned data and mathematical representations of the stored data. The stored scalar information may be accessed and used by other components of the system 100, as will be discussed in greater detail below.

A data fusion unit 250 of the engine diagnostics module 120 receives the health indicators from the fault classification unit 230. The data fusion unit 250 additionally receives historical scalars from the scalar unit, and fuses this data to increase confidence of the health indicators. The health indicators, which may now include enhanced fault confidence and severity information for the engine components, are then available for use by other modules or the user.

Figure 3:
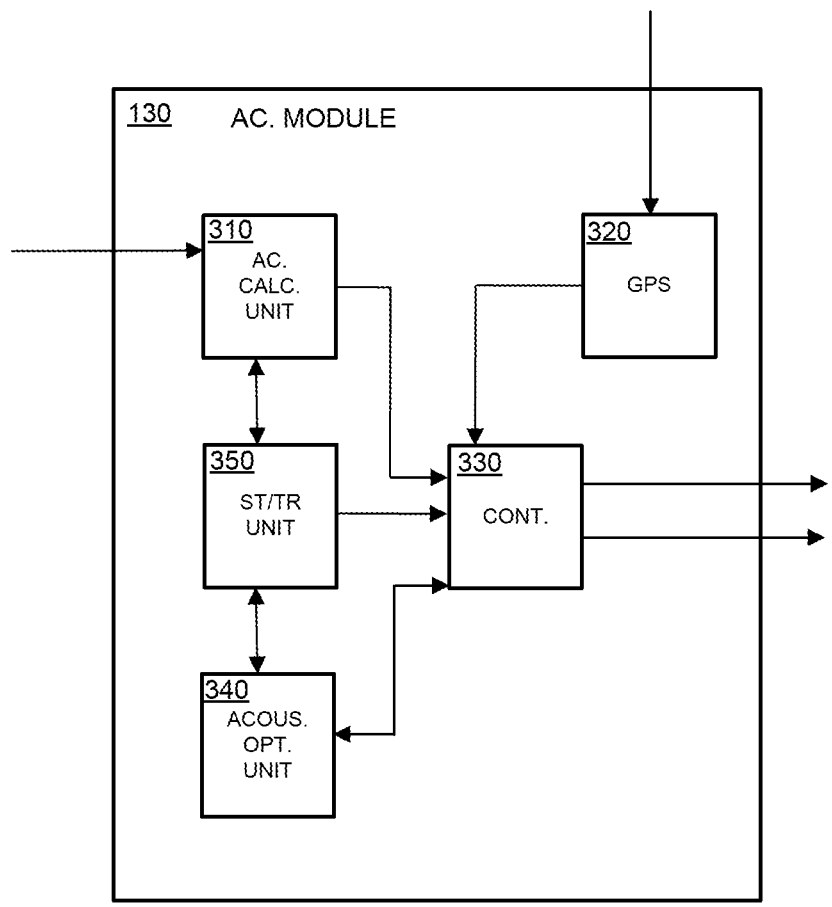
FIG. 3 is a block diagram of an acoustics module of the operations support system of FIG. 1 in accordance with an exemplary embodiment.

FIG. 3 is a block diagram of the acoustics module 130 in accordance with an exemplary embodiment. In general, the acoustics module 130 accurately evaluates the acoustics of the gas turbine engine (e.g., engine 110 of FIG. 1) and, if necessary, adjusts operation of the engine and/or aircraft to achieve desired acoustic characteristics. FIGS. 1 and 3 will be referenced below.

As shown, the acoustics module 130 includes an acoustics calculation unit 310, a global position system (GPS) unit 320, an acoustics controller 330, an acoustics optimizer unit 340, and a trending and storage unit 350. In general, the acoustics calculation unit 310 receives the diagnostics data (e.g., condition and health indicators and/or the scalars) from the engine diagnostics module 120. The diagnostics data may reference parameters such as turbine inlet temperature, turbine interstage temperatures and pressures, combustor inlet temperatures and pressures, combustor exit temperatures and pressure, combustor loading, fuel flow, air flows, gas velocities, compressor inlet temperatures and pressures, compressor exit temperatures and pressures, and other parameters that may be indicators of acoustic characteristics. In response, the acoustics calculation unit 310 is configured to calculate or otherwise estimate the acoustic characteristics of the engine 110. For example, the acoustics calculation unit 310 may determine the overall noise level of the engine 110, e.g., in decibels. In other embodiments, the acoustics calculation unit 310 may determine the local noise level at various locations within the engine 110. Typically, obtaining an accurate, direct measure of acoustics characteristics may be difficult, but the model-based approach of the acoustics calculation unit 310 enables a reliable and accurate calculation. In some embodiments, the acoustics calculation unit 310 may determine noise at prescribed locations outside the aircraft while it on the ground or in flight. These models may be based on semi-empirical scaling of engine source noise as well as semi-empirical noise propagation models.

In one exemplary embodiment, the acoustics calculation unit 310 may or may not use variable charts that are functions of ambient or flight conditions and/or require pilot interaction, or pre-determined assumptions about engine lapse rates, or rely on aircraft set-up to called-out conditions. This results in an improved, more accurate, and consistent acoustics calculation.

The acoustics calculation unit 310 provides the acoustic characteristics to the acoustics controller 330, as discussed below. In some embodiments, the acoustics calculation unit 310 may be incorporated into or integrated with the thermodynamic models of the engine diagnostics module 120 and may be empirically established to calculation the acoustics characteristics. As such, the model of the acoustics calculation unit 310 may react to the supplied data. Engine diagnostics scalars may be coefficients and biases to the thermodynamic equations in the models to provide acoustics calculations.

As noted above, the acoustics module 130 additionally includes the GPS unit 320. In general, the GPS unit 320 includes a receiver tuned to receive broadcast signals transmitted by GPS satellites. Based on these signals, the GPS unit 320 may determine, for example, aircraft position, groundspeed, and ground track angle. In some embodiments, the GPS unit 320 may receive information from the flight management system (FMS) (not shown). The information may include, for example, flight plan information to provide the GPS unit 320 information about the future position of the aircraft. The GPS unit 320 provides the aircraft position information and other data to the acoustics controller 330.

As such, the acoustics controller 330 receives acoustic characteristics from the acoustics calculation unit 310 and position information from the GPS unit 320. The acoustics controller 330 may evaluate the acoustics information for a number of purposes. For example, the acoustics information may provide information about the engine health, particularly a sudden change in engine health such as foreign object injection or installation changes. In some embodiments, the acoustic information may be used for troubleshooting, trending, and tracking. For example, maintenance actions may be triggered, faults detected, or component failures identified via acoustic information.

Additionally, the acoustics controller 330 may evaluate the acoustics information in view of the position information from the GPS unit 320. In particular, certain locations may be subject to different requirements with respect to noise. For example, if the aircraft is on the ground or near a populated location, government or corporate regulations may limit the amount of noise generated by the aircraft. On the other hand, if the aircraft is at cruising altitude over an unpopulated area, there may not be any noise restrictions. Other considerations that may impact the evaluation of the acoustics information by the acoustics controller 330 may include altitude, weather, and time of day.

As such, the acoustics controller 330 may determine that the acoustics for the engine 110 exceeds a desirable level. In such a situation, the acoustics controller 330 may take steps to adjust the acoustics. In particular, the acoustics controller 330 may provide the acoustics information and the desired acoustics level to the acoustics optimizer unit 340. In some embodiments, the acoustics controller 330 may provide the acoustics information to the graphical user interface 140 for display to the user, as described below.

The acoustics optimizer unit 340 evaluates the actions necessary to reduce the acoustics level of the engine 110. The acoustics optimizer unit 340 is configured to determine the impact of adjusting the operating conditions on the acoustics and/or determine the operating parameters that generate the minimal acoustics level while maintaining power or speed requirements. As such, the acoustics optimizer unit 340 may have a component-specific thermodynamic model, such as the models discussed above with respect to the engine diagnostics module 120 and the acoustics calculation unit 310. In some embodiments, the acoustics optimizer unit 340 may receive scalar inputs from the engine diagnostics module 120 (FIG. 2) and monitor scalar changes, both long-term and short-term. The conditioned scalars and desired or proposed adjustments are provided to the acoustics optimizer unit 340 that uses a thermodynamic model to predict the resulting engine acoustic characteristics. As in the model discussed above in the diagnostic unit 220 (FIG. 2), the model used by the acoustics optimizer unit 340 is fully automated, steady state, and based on a mathematical representation of component maps. In one exemplary embodiment, the acoustics optimizer unit 340 is configured to generate the engine adjustments until the acoustics level is less than a predetermined acoustic limit for the relevant location.

One exemplary operation of the acoustics optimizer unit 340 will now be described. The engine component scalars of the engine diagnostics data are processed through the thermodynamic model, which does not otherwise react to the engine data. Instead, the acoustics optimizer unit 340 uses the component scalars are used to establish an engine-specific model as an accurate representation of the actual engine. The model may then be used to predict the engine performance and acoustics at a specific rating condition (e.g., at the designated inlet temperature, altitude, power, installation configuration, and the like). In this embodiment, the acoustics optimizer unit 340 may run a matrix of points around the operating condition of the moment, including inlet temperature, inlet pressure, engine load, shaft power, bleed flow, governing speeds, and variables under possible use by the control systems such as gas generator speeds, power turbine speed, variable compressor inlet geometry, variable exhaust geometry, variable turbine inlet geometry, variable exhaust geometry, and variable low compressor inlet and exit geometry. The model processes this system of variables with adders and subtractors on the present values and note the changes that results. The acoustics optimizer unit 340 may thus calculate the combination of variables that produces a reduced or minimal acoustics signature while providing the required engine loading.

As an example, the acoustics optimizer unit 340 may determine that a reduction in engine power is necessary to achieve the desired acoustics. Other modifications may include varying engine speed, varying geometry, and varying engine bleed. Still further options may include requesting pilot intervention and/or modifying operating mode. In a marine or industrial setting, modifications may include environmental changes, such as choice supercharging, variable exhaust, water injection, and the like. The acoustics optimizer unit 340 may provide the proposed adjustment to the acoustics controller 330. In some embodiments, the acoustics optimizer unit 340 may suggest installation changes or adjustments, such as adjusting the position of inlet doors, as an example. These adjustments may be generally referred to as geometry adjustments and may be provided to the acoustics controller 330 for automatic adjustment (e.g., in turn, provided to the engine controller 150) and/or to the GUI 140 for pilot intervention.

In response, the acoustics controller 330 may generate commands for an engine controller to actively and/or automatically adjust operation of the engine 110 to achieve the desired acoustics level. In some embodiments, the acoustics controller 330 may generate display commands for the graphical user interface 140 regarding the acoustics level, any acoustics restrictions, and/or any proposed adjustments to engine operation. As such, the user may be presented with such information for manual action or consideration.

In some embodiments, the acoustics controller 330 may also receive a mission profile from a mission profile unit and other aircraft data. The mission profile can include acoustics requirements, as well as aircraft power requirements and mission operational statistics, aircraft configuration, mission duration, mission criticality, mission environment, flight regime, flight profile histories, and flight profile derivatives. As such, the acoustics controller 330 may tailor the acoustic characteristics (e.g., the level, temporal, and geographical characteristics) to a mission profile. In a further embodiment the acoustics controller 330 may suggest an alternate flight path, e.g., one that enables the engine 110 and the aircraft to comply with the relevant noise regulations. As noted above and as will now be discussed in greater detail, the acoustics controller 330 may provide the acoustic characteristics to the graphical user interface 140 for display to the user.

Any of the data discussed above may be provided to the data trending and storage unit 350, including input parameters from the engine (e.g., engine system 110), diagnostic indicators (e.g., from engine diagnostic module 120), engine parameters and acoustics information from the acoustics calculation unit 310, geometry adjustments and other signature information from the acoustics optimizer unit 340, and other data from system 100. As such, the data trending and storage unit 350 may include any suitable database or storage medium and processing components necessary for receiving, storing, and providing relevant information to the various units and/or external systems. For example, the data trending and storage unit 350 provides binning and storing of this data, as well as statistical analysis and trending for use in historical analysis or performance over time. Data trending may be used to increase confidence in these numbers.

FIG. 4 is a visual display 400 rendered by the operations support system 100 of FIG. 1 in accordance with an exemplary embodiment. The visual display 400 may be provided, for example, on the graphical user interface 140. The visual display 400 displays acoustics and other information based on data, for example, from the engine diagnostics module 120 and acoustic module 130.

In the depicted exemplary embodiment, the visual display 400 includes an acoustics graphic 410. The acoustics graphic 410 depicts a current acoustics level 420 to provide the pilot an indication of the acoustics level of the engine 110. If applicable, the acoustics graphic 410 further includes an acoustics limit 430. The acoustics limit 430 may be based on, for example, geographic position or altitude of the aircraft. In the exemplary embodiment depicted by FIG. 4, the acoustics level 420 is greater than the acoustics limit 430, thereby indicating that the aircraft engine is generating an unacceptable level of noise. In some embodiments, the operations support system 100 may automatically adjust operation of the engine 110 to reduce the acoustics level to an acceptable level. However, in some embodiments, the operation support system 100 may alert the user to the acoustics situation, for example, by providing a message 440 on the visual display 400. In the exemplary embodiment of FIG. 4, the message 440 enables the pilot to command the operation support system 100 to adjust the acoustic characteristics of the engine 110, as discussed above. The message 440 may also provide, for example, information about operational limits, such as the minimum or maximum speed or bleed load for a particular flight mode. In some embodiments, the display 400 may depict acoustic characteristics over time.

Additionally, in some embodiments, the visual display 400 may include a switch 402 that may be used to actuate the acoustics optimization (e.g., selectively activate or deactivate the acoustics module 130 and/or automatic adjustments from the acoustics optimization unit 340. Additionally, the visual display 400 may provide engine diagnostic indications in the form of noise level of components or groups of components. For example, as shown, the visual display 400 includes a compressor noise level 450 with a current compressor noise level 452 and an expected value or limit value 454 for the compressor noise level and a turbine noise level 460 with a current compressor noise level 462 and an expected value or limit value 464 for the compressor noise level.

In general, any suitable display or graphical representations may be provided. Additionally, the acoustics graphics may provide an indication of engine health. For example, if the acoustics level is unusually high, one or more of the engine components may be malfunctioning, and the diagnosis of such health indicators may be displayed for the pilot.

The model-based acoustics module 130 provides the ability to continuously and accurately determine engine acoustics, particularly as a function of location and flight conditions, thereby reducing the likelihood of excessive noise generation and/or unnecessary reduction in engine power. As such, the system 100 enhances situation awareness and engine operation.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An operations support system for an engine, comprising:
a diagnostics module configured to receive engine data from the engine and to generate diagnostics data based on the engine data using a thermodynamic model, the thermodynamic model being based on component maps associated with the engine;
an acoustics module coupled to the diagnostics module and comprising an acoustics calculation unit, the acoustics calculation unit configured to receive the diagnostics data and to determine an acoustics level for the engine based on the diagnostics data; and
a graphical user interface coupled to the acoustics module and configured to display the acoustics level.

2. The operations support system of claim 1, wherein the acoustics module further comprises a controller coupled to the acoustics calculation unit and configured to evaluate the acoustics level.

3. The operations support system of claim 2, wherein the acoustics module further comprises a GPS unit coupled to the controller and configured to provide position information to the controller, the controller configured to evaluate the acoustics level based on the position information.

4. The operations support system of claim 3, wherein the acoustics module further comprises an acoustics optimizer unit coupled to the controller, the acoustics optimizer unit configured to generate engine adjustments to decrease the acoustics level.

5. The operations support system of claim 4, wherein the controller is configured to provide commands based on the engine adjustments from the acoustics optimizer unit.

6. The operations support system of claim 5, wherein the controller is configured to determine a predetermined acoustics limit based on the position information.

7. The operations support system of claim 6, wherein the acoustics optimizer unit is configured to generate the engine adjustments until the acoustics level is less than the predetermined acoustics limit.

8. The operations support system of claim 1, wherein the acoustics calculation unit configured to continuously determine the acoustics level of the engine.

9. The operations support system of claim 1, wherein the diagnostics module is further configured to generate scalars based on the engine data, the acoustics calculation unit determining the acoustics level for the engine based on the scalars.

10. The operations support system of claim 9, wherein the diagnostics module is further configured to adjust the thermodynamic model based on the scalars.

11. The operations support system of claim 10, wherein the thermodynamic model is an engine-specific model.

12. The operations support system of claim 11, wherein at least a portion of the scalars represent erosion within the engine.

13. A method for supporting operations of an engine, comprising the steps of:
    collecting engine data;
    generating diagnostics data from the engine data using a thermodynamic model based on component maps associated with the engine;
    calculating acoustics level from the diagnostics data; and
    displaying the acoustics level on a graphical user display.

14. The method of claim 13, further comprising the step of evaluating the acoustics level with a controller.

15. The method of claim 14, further comprising the step of receiving position information, and wherein the evaluating step includes evaluating the acoustics level based on the position information.

16. The method of claim 15, further comprising the steps of generating engine adjustments to decrease the acoustics level, and adjusting engine operation based on the acoustics level.

17. The method of claim 16, further comprising the step of determining a predetermined acoustics limit based on the position information, wherein the generating step includes generating the engine adjustments until the acoustics level is less than the predetermined acoustic limit.

18. The method of claim 13, wherein the calculating step includes continuously calculating the acoustics level of the engine.

19. The operations support system for an engine, comprising:
    a diagnostics module configured to receive engine data from the engine and to generate diagnostics data based on the engine data using a thermodynamic model, the thermodynamic model being based on component maps associated with the engine, the diagnostic data including engine scalars;
    an acoustics module coupled to the diagnostics module and comprising an acoustics calculation unit, the acoustics calculation unit configured to receive the diagnostics data and to determine an acoustics level for the engine based on the engine scalars of the diagnostics data generated by the thermodynamic model; and
    a graphical user interface coupled to the acoustics module and configured to display the acoustics level.

20. The operations support system of claim 1, wherein the acoustics calculation unit is incorporated into the thermodynamic model to generate the acoustics level for the engine based on the diagnostics data.

* * * * *